(12) United States Patent
Banerian et al.

(10) Patent No.: US 10,374,692 B1
(45) Date of Patent: Aug. 6, 2019

(54) PERSISTENT LEO SPACECRAFT COMMUNICATIONS

(71) Applicant: LOCKHEED MARTIN CORPORATION, Bethesda, MD (US)

(72) Inventors: David John Banerian, Littleton, CO (US); Christopher C. Bianchi, Churchville, PA (US); Arthur Paolella, Indian Harbour Beach, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 4 days.

(21) Appl. No.: 15/729,536

(22) Filed: Oct. 10, 2017

Related U.S. Application Data

(60) Provisional application No. 62/477,372, filed on Mar. 27, 2017.

(51) Int. Cl.
| | |
|---|---|
| *H04B 7/185* | (2006.01) |
| *H04B 7/204* | (2006.01) |
| *H04B 7/19* | (2006.01) |
| *H04B 7/195* | (2006.01) |

(52) U.S. Cl.
CPC ........... *H04B 7/18508* (2013.01); *H04B 7/19* (2013.01); *H04B 7/195* (2013.01); *H04B 7/204* (2013.01)

(58) Field of Classification Search
None
See application file for complete search history.

(56) References Cited

U.S. PATENT DOCUMENTS

| | | | |
|---|---|---|---|
| 8,220,038 B1* | 7/2012 | Lucchesi | H04L 63/105 726/4 |
| 2008/0001818 A1* | 1/2008 | Cohen | G01S 19/07 342/357.44 |
| 2009/0168861 A1* | 7/2009 | Marshall | H04B 1/7103 375/227 |
| 2014/0105100 A1* | 4/2014 | Tronc | H04B 7/18513 370/321 |
| 2016/0087713 A1* | 3/2016 | Oderman | H04B 7/18591 370/319 |
| 2018/0013486 A1* | 1/2018 | Irani | H04B 7/18521 |

\* cited by examiner

*Primary Examiner* — Candal Elpenord
(74) *Attorney, Agent, or Firm* — Morgan, Lewis & Bockius LLP (57) ABSTRACT

A system includes a Mobile User Objective System (MUOS) geostationary earth orbit (GEO)-based communication satellites (ComSat) to provide a persistent and on-demand communication links between multiple LEO space vehicles, their associated air and/or ground users and operations centers. The system further includes one or more LEO space vehicles that can communicate with the GEO-based MUOS ComSats using UHF communication links. Each of the LEO space vehicles includes radio circuitry to enable communicating over an ultra-high frequency (UHF) band used by the MUOS GEO communication link in compliance with the MUOS Wideband Code-Division Multiple-Access WCDMA waveform standard or other user defendable waveforms.

20 Claims, 5 Drawing Sheets

PERSISTENT LEO SPACECRAFT COMMUNICATIONS

CROSS-REFERENCE TO RELATED APPLICATIONS

This application claims the benefit of priority under 35 U.S.C. § 119 from U.S. Provisional Patent Application 62/477,372 filed Mar. 27, 2017, which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to data communications, and more particularly to persistent Low Earth Orbit (LEO) spacecraft communications.

BACKGROUND

Communications services and topologies between ground control centers and associated Low Earth Orbit (LEO satellite or spacecraft segments/elements may typically be implemented in two basic fashions. One implementation uses Direct Down-Links (DDLs) between a LEO space terminal and ground terminals, such as Air Force Satellite Central Network (AFSCN) or a variety of commercial ground terminal services. Another implementation may include commercial or government owned and operated Geostationary Earth Orbiting (GEO) relays, such as the Tracking and Data Relay Satellite System (TDRSS), Milstar or other GEO based commercial satellites. Direct to ground links for LEO spacecraft's require proliferation and multiple ground terminals to increase service access and intervals, protocols and formats, with service intervals limited to short contact times with specialized links. Use of GEO relay systems, face other operational resource constraints affecting scheduling, prioritization, service acknowledgement, high use costs and sophisticated spacecraft communication terminals to provide link closure.

Inherent characteristic of many of today's LEO space systems and their communications paths are coupling of command forward paths with return wideband mission data paths. The operational and functional mission nature of many of these LEO systems is optimized when tasking is separate from mission data return, for example, when a mission event is tasked or initiated, it is not often conducive to when the data is needed by ground mission data processing centers. Therefore, decoupling forward and return paths is not only desirable, but very advantageous when considering responsiveness to adhoc spacecraft tasking along with increased cost effectiveness, especially where wideband GEO relay scheduling is extremely costly and constrained.

SUMMARY

In some aspects, a system includes use of GEO based communication satellites (ComSat) to provide a persistent and on-demand communication link. The system further includes one or more LEO space vehicles that can communicate with the GEO-based Mobile User Objective System (MUOS) relay satellite constellation. Communications links between the LEO spacecraft and MUOS GEO satellite constellation may use a Wideband Code Division Multiple Access (WCDMA) waveform within the Ultra High Frequency (UHF) band, or user defined waveforms compatible with the MUOS bandwidth and RF spectrum. Associated Ground based LEO satellite operations centers may communicate across the MUOS constellation via global MUOS Teleports.

In one or more other aspects, a method includes use of the MUOS GEO ComSat constellation to provide a persistent, on-demand and unscheduled communications access across all LEO orbit regimes—satisfied by logical/physical internet protocol accesses between the spacecraft and core MUOS Network.

In yet other aspects, LEO satellite communications via the MUOS network may be allowed ability to self-initiate contacts with other LEO satellites or air or ground based clients/users within the MUOS network. Benefits to this capability may provide responsive on-demand interoperability across the global MUOS client/users base to support peer-to-peer LEO.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to operational methods and configurations to address solutions to achieve persistent low earth orbit (LEO) spacecraft communications. The subject operational and architectural concepts with supporting technologies are generally directed to one or more topologies that provide low bandwidth unscheduled persistent on-demand communications between a LEO spacecraft and the GEO based mobile user objective system (MUOS) relay satellite constellation. Persistent on-demand communications may be accomplished via direct communications with MUOS GEO communication satellites (ComSats). The communications link may use a wideband code division multiple access (WCDMA) waveform within the ultra-high frequency (UHF) band, or user defined waveforms compatible with the MUOS bandwidth and RF spectrum. Associated ground-based LEO satellite operations centers can communicate directly to one or more MUOS of the MUOS GEO constellation or via MUOS teleports.

In some aspects, the subject technology enables a number of capabilities such as seamless and/or unscheduled global LEO communication services and on-demand access and autonomous self-initiated contacts, as described in more details herein. For example, persistent LEO spacecraft access may be satisfied at the global scale in support of the entire LEO orbit regimes, including IP access such as logical and/or physical protocol accesses between the spacecraft and a core MUOS Network. The clients on the MUOS network service may allow interconnection between other peer-level LEO spacecraft operating within the same link protocols, or links to other MUOS network users to include air and ground users. Benefits and application of this service for LEO spacecraft clients may include supporting a variety of data transfers such as command, control, telemetry, ephemeris and low-rate payload data transfers.

Another important attribute of the subject technology is the ability to allow LEO spacecraft to have on-demand access to the global MUOS network. Within the MUOS operational guidelines for user priorities and service class (e.g., rates, quality, etc.), multiple LEO spacecraft can be part of an open network and thus allowing communications connections across a multitude of clients and/or users. Seamless connectivity is enabled by the inherent MUOS architecture to support global coverage. In this case LEO Spacecraft may transition connections across the four GEO nodes and associated beams, providing a seamless connection into the network from the entire LEO orbit regimes. This capability is beneficial to allow spacecraft ground operations centers, or other clients and/or users on the MUOS network, to have open uninhibited access to the associated LEO Spacecraft.

On demand access and autonomous self-initiated contacts can be particularly vital when considering various mission applications. For example, the LEO Spacecraft may be enabled to self-initiate contacts with other clients and/or users within the MUOS network. Benefits of this capability may include on-demand interoperability across the global MUOS clients and/or users base to support peer-to-peer LEO Spacecraft data exchanges, or interconnections between LEO spacecraft and aircraft or ground users.

In an aspect of the subject technology, beyond the persistent LEO low band communications technology, use of the same capability may also support military theater broadcast via the MUOS integrated broadcast service (IBS) directly from a LEO spacecraft. The use of the MUOS IBS service may allow direct broadcast of pre-processed LEO spacecraft sensor (e.g., categorized as an unattended sensor) information, directly into the receivers of field units, such as aircrafts, troops, hand held terminals, ships, unmanned aerial vehicles (UAVs), and other field devices.

The disclosed approach may provide full duplex, via a low probability-of-intercept (LPI) and/or low probability-of-detection (LPD) UHF path/service, for example, at 32 Kbps, with capability to expand to 384 Kbps (e.g., depending on bandwidth allocations). The subject architecture and technology may provide many advantageous benefits resulting from persistent low-band command and telemetry paths. Examples of the benefits include segregating from wideband mission data paths; lowering cost by reducing complexity; reducing government costs by offsetting needs of air force satellite central network (AFSCN) or commercial space-to-ground links (SGLs); and satisfying ground control center access to the LEO spacecraft via secret internet protocol router network (SIPRNET) or non-classified internet protocol router network (IPNET) through standard IP access. In some aspects, the subject technology may employ development of a MUOS interface compliant UHF/WCDMA space terminal and complementary ground based service and/or session management capabilities that interface with SIPRNET/NIRNET access to the MUOS ground teleport. Implementation of these technologies may require control and management for seamless connection across beams within the same MUOS satellite or across MUOS GEO satellite nodes. Additionally, a direct to theater broadcast service capability may be provided, allowing wide area dissemination of generated LEO spacecraft data via their associated MUOS GEO overhead relay, allowing timely distribution of data vital to theater operations to a multitude of air/surface field units.

The disclosed solution allows simplex wideband return path (low cost) that enables users to task system sensors on-demand, independent of wideband returns. Low bandwidth services may be absorbed as good faith estimate (GFE) costs. The subject technology may offset a need for air force satellite central network (AFSCN) space-to-ground link (SGL), for example, MUOS UHF beam patterns can support full $4\pi$ steradians and can obtain ground control center access to the LEO spacecraft via the secret Internet protocol router network (SIPRNET) or the non-classified Internet protocol router network (IPNET) through standard IP Access. In some aspects, the subject technology may employ development of a MUOS interface compliant UHF/WCDMA space terminal and ground nodes compliant with SIPRNET and/or non-secure Internet protocol router network (NIRNET) access to the MUOS ground teleport.

Figure 1:
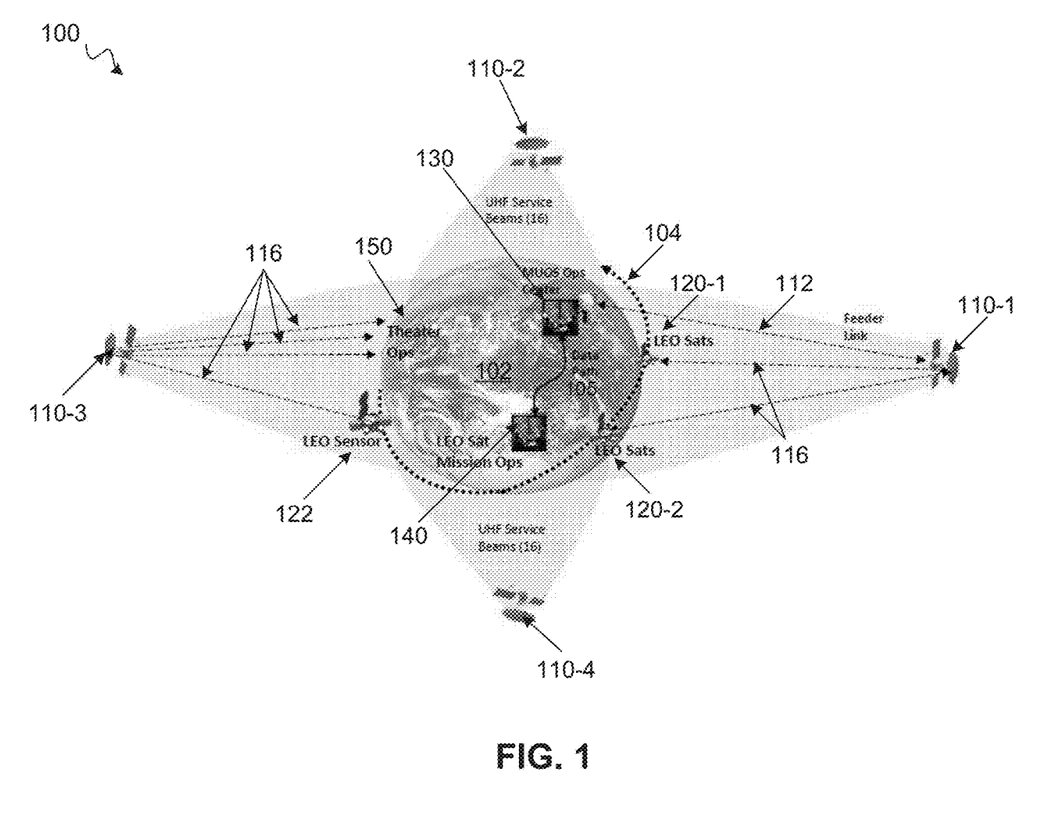
FIG. 1 is a conceptual topology illustrating an example of a global communications environment for achieving persistent LEO spacecraft communications, according to certain aspects.

FIG. 1 is a conceptual topology illustrating an example of a global communications environment 100 for achieving persistent low earth orbit (LEO) spacecraft communications, according to certain aspects. The environment 100 includes a number of (e.g., 4) GEO-based communication satellites (ComSats) 110 (e.g., 110-1, 110-2, 110-3 and 110-4) and one or more LEO space vehicles (e.g., satellites) 120 (e.g., 120-1 and 120-2) orbiting the Earth and LEO sensors 122. In some aspects, the GEO-based ComSats are MUOS ComSats of a MUOS GEO constellation. The environment 100 further includes a MUOS operations center 130, a LEO satellite mission operations center 140, and field theater operations center 150.

The GEO-based ComSats 110 (hereinafter "MUOS ComSats 110") can communicate with the MUOS operations center 130 via feeder links 112 operating in a suitable frequency band (e.g., Ka band). The MUOS ComSats 110 have persistent and/or on-demand communication links 116 with the LEO satellites 120, LEO sensors 122 and the theater operations center 150. The persistent and/or on-demand communication link includes an LPI and/or an LPD UHF link (e.g., path and/or service) at a data rate of, for example, 32 Kbps, with capability to expand to 384 Kbps (e.g., depending on bandwidth allocations). Each of the MUOS ComSats 110 (e.g., 110-1) can support multiple (e.g., 16) communication links. Each communication link (also referred to as "beam") covers a certain area over the Earth 102, such that the entire surface of the Earth 102 is covered by the beams of the four MUOS ComSats 110. The MUOS operations center 130 and the LEO operation centers 140 can communicate over a link (e.g., data path) 105, for example using an IP network such as the Internet, SIPRNET or NIRNET. The MUOS ComSats 110 can receive mission data from the space vehicles 120 and communicate the mission data to field theater operations center 150 that can in turn deliver the data to ground-based units including aircraft, hand held terminals, ships, unmanned aerial vehicles (UAVs).

Figure 2:
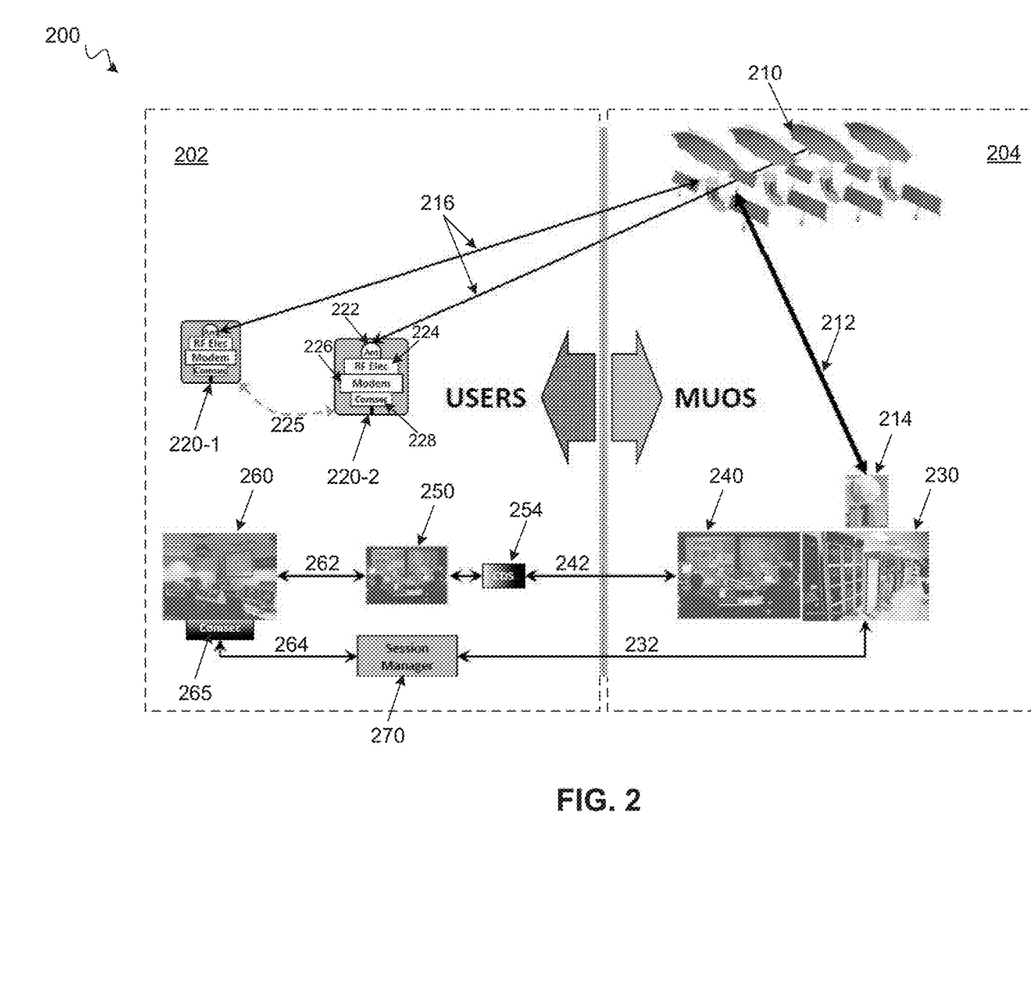
FIG. 2 is a conceptual diagram illustrating an example architecture of a persistent LEO spacecraft communications system, according to certain aspects.

FIG. 2 is a conceptual diagram illustrating an example of architecture of a persistent LEO spacecraft communications system 200, according to certain aspects. The persistent LEO spacecraft communications system 200 (hereinafter "communication system 200") includes users side 202 and MUOS side 204. The users side 202 includes LEO space vehicles or spacecraft 220 (e.g., 220-1 and 220-2) and LEO mission operations center 260, which use the services of the MUOS side 204. The space vehicles 220 can communicate with each other via communication link 225 and are in communication with the LEO operations center 260. The communication link 225 may be a virtual and/or logical peer-to-peer network interconnection. The LEO operations center 260 can communicate with the ground-based facilities in the MUOS side 204 through a domain service manger 250, a cross-domain solution (CDS) firewall and a session manager 270. The LEO operations center 260 (e.g., ground-based) control stations) can access the space vehicles 220 via the SIPRNET or the NIRNET through IP access.

The MUOS side 204 includes multiple (e.g., 4) MUOS ComSats 210 and ground-based facilities including MUOS teleports 214, a MUOS interface facility 230 and a MUOS network control center 240. The MUOS teleports 214 are ground-based terminals that are either terrestrial terminals or are located in the atmosphere. They can communication with the MOUS ComSats 210 via a feeder link 212 using radio waves and operating in a suitable frequency band (e.g., Ka band). The MUOS teleports 214 can provide and receive data through this link from the MUOS ComSats 210. The MUOS teleports 214 are in communication with the MUOS network control center 240 through the MUOS interface facility 230. The MUOS interface facility 230 also is an interface between the MUOS teleports 214 and the session manager 270 and can communicate command and data associated with LEO space vehicles with the session manger 270. Communications between the MUOS interface facility 230 and the session manger 270 can take place over a link 232, which can be an IP network such as the Internet, SIPRNET or NIRNET.

The session manger 270 is responsible for node and beam handovers and interconnectivity, as the LEO space vehicles 220 move from one beam (e.g., link 216) to another beam similar to cell phone users moving from one cell to another cell of a cellular network. The session manger 270 is linked through a communication security (Comsec) block 265 to the LEO mission operations center 260. The Comsec block 265 is responsible for encoding and decoding of the data received from or transmitted to the session manger 270. The LEO mission operations center 260 can communicate with the LEO space vehicles 220 via an IP network such as the Internet, SIPRNET or NIRNET.

The MUOS ComSats 210 can receive sensors and payload data from LEO space vehicles via the UHF link 216 and communicate data (e.g., sensor and payload data) and/or commands and control to one or more surface field units such as spacecrafts and naval vessels through field theater operations centers (e.g., 150 of FIG. 1). The UHF link 216 can be a LPI and/or LPD UHF path/service, for example, at 32 Kbps, with capability to expand to 384 Kbps, depending on bandwidth allocations.

In one or more implementations, each space vehicle (e.g., LEO satellite) 220 includes an antenna 222 and circuitry that can enable communicating over the UHF band used by the communication link (e.g., beam) 216. The circuitry includes, for example, a radio-frequency (RF) circuit 224, a modem 226, and a Comsec circuit 228. In some aspects, the antenna 222 can be an RF (e.g., UHF) omni-directional (e.g., 4-π steradian) antenna. The radio-frequency (RF) circuit 224 includes RF electronic circuits such as RF low-noise amplifiers (LNAs), RF filters, mixers, and other analog RF circuits that are operable in MUOS compatible UHF band. The modem 226 may include suitable analog and/or digital circuits and/or codes for modulation and demodulation of the RF signals compatible with the MUOS WCDMA waveforms and compliant network protocols and provide Doppler compensation and manage access across MUOS beam handovers. The Comsec 228 may include suitable analog and/or digital circuits and/or codes that are capable of encryption and decryption of data to provide and maintain communication security.

Figure 3:
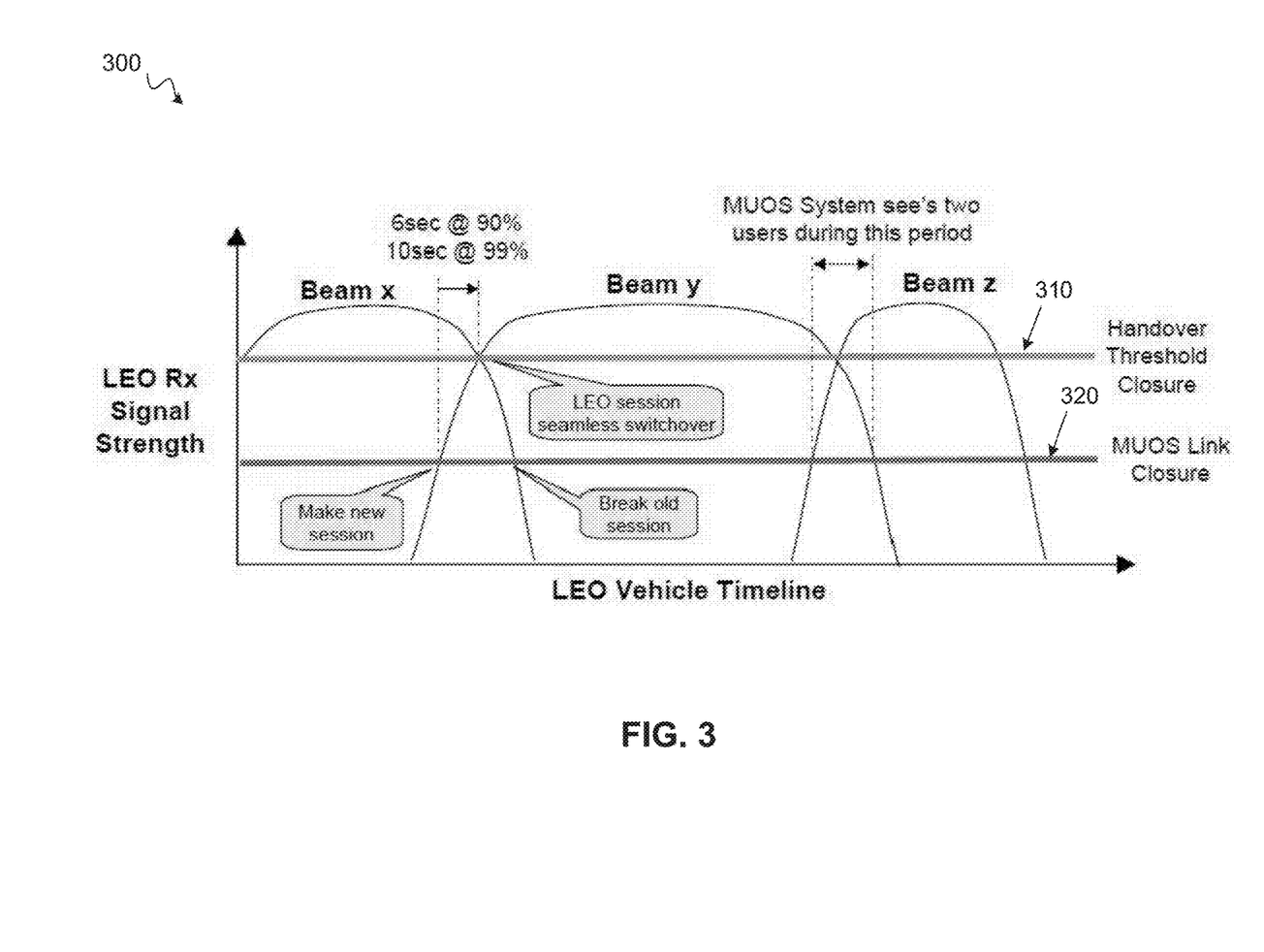
FIG. 3 is a chart illustrating an example make-before-break session setup approach for beam handover, according to certain aspects.

FIG. 3 is a chart 300 illustrating an example make-before-break session setup approach for beam handover. Depending on LEO satellite modem design, beam handovers may be accomplished in make-before-break or break-then-make. In make-before-break session setup, the chart 300 is a plot of LEO receives (Rx) signal strength versus LEO space vehicle timeline. In the chart 300, the signal strength levels 310 and 320, respectively, corresponding to the MUOS link closure and handover threshold closure are shown with two horizontal lines. Intersection of beams x, y, and z signals with handover threshold closure line 310 may indicate the LEO session seamless switchover points. Make and break points for two neighboring signals (e.g., Beam x and beam y, or beam y and beam z) may be defined by the intersection of the MUOS link closure line 320 with the neighboring signals.

Figure 4:
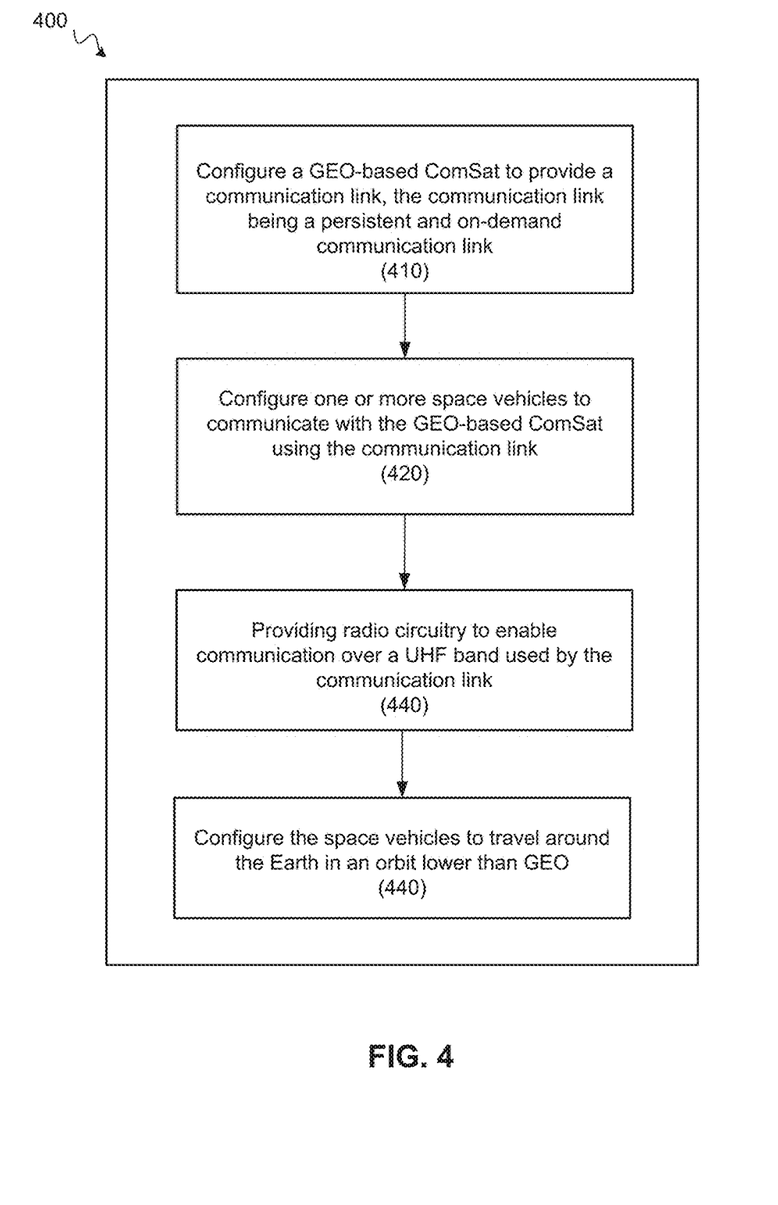
FIG. 4 is a flow diagram illustrating an example method for providing a persistent LEO spacecraft communications system, according to certain aspects.

FIG. 4 is a flow diagram illustrating an example method 400 for providing a persistent LEO spacecraft communications system, according to certain aspects. The method 300 begins by configuring a GEO-based ComSat (e.g., 110 of FIG. 1) to provide a persistent and on-demand communication link (e.g., 116 of FIG. 1) (410). One or more space vehicles (e.g., 120 of FIG. 1) are configured to communicate with the GEO-based ComSat using the communication link (420). LEO satellite radio circuitry (e.g., 224, 226 and 228 of FIG. 2) is provided to enable communication over an UHF band used by the MUOS LEO to GEO communication link (430). The LEO space vehicles are enabled to travel around the Earth (e.g., 102 of FIG. 1) in an orbit (e.g., 104 of FIG. 1) lower than GEO (440).

Figure 5:
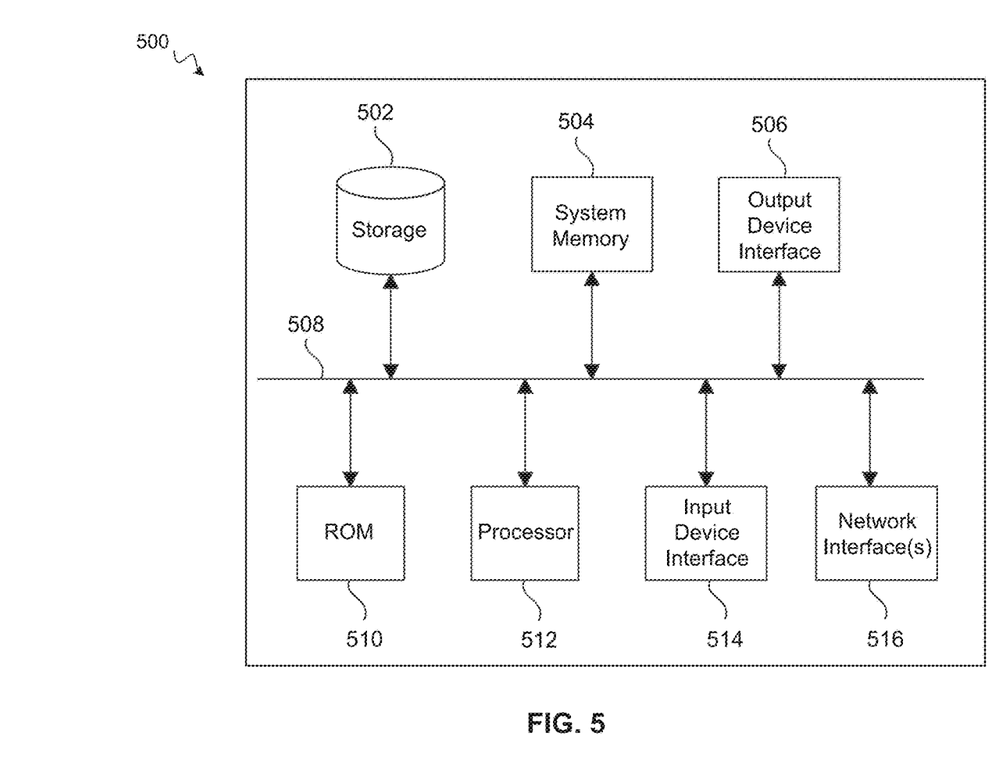
FIG. 5 is a block diagram conceptually illustrating an electronic system with which aspects of the subject technology are implemented.

FIG. 5 is a block diagram conceptually illustrating an electronic system with which aspects of the subject technology are implemented. The electronic system 500, for example, can be a network device, a media converter, a desktop computer, a laptop computer, a tablet computer, a server, a switch, a router, a base station, a receiver, a phone, or generally any electronic device that transmits signals over a network. Such an electronic system 500 includes various types of computer readable media and interfaces for various other types of computer readable media. In one or more implementations, the electronic system 500 can be part of the electronic system of the Geo MUOS space vehicles 120, the LEO sensor 122, the satellite mission operation center 140 or MUOS operation center 130 of FIG. 1. The electronic system 500 includes a bus 508, one or more processing unit(s) 512, a system memory 504, a read-only memory (ROM) 510, a permanent storage device 502, an input device interface 514, an output device interface 506, and a network interface 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system. The permanent storage device 502, on the other hand, is a read-and-write memory device. The permanent storage device 502 is a non-volatile memory unit that stores instructions and data even when the electronic system 500 is off. One or more implementations of the subject disclosure use a mass storage device (such as a magnetic or optical disk and its corresponding disk drive) as the permanent storage device 502.

Other implementations use a removable storage device (such as a floppy disk, flash drive, and its corresponding disk drive) as the permanent storage device 502. Like the permanent storage device 502, the system memory 504 is a read-and-write memory device. However, unlike the permanent storage device 502, the system memory 504 is a volatile read-and-write memory, such as random access memory. System memory 504 stores any of the instructions and data that the one or more processing unit(s) 512 needs at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input device interface 514 and the output device interface 506. The input device interface 514 enables a user to communicate information and select commands to the electronic system. Input devices used with the input device interface 514 include, for example, alphanumeric keyboards and pointing devices (also called "cursor control devices"). The output device interface 506 enables, for example, the display of images generated by the electronic system 500. Output devices used with the output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks (not shown) through one or more network interfaces 516. In this manner, the computer can be a part of one or more network of computers, such as a peer-to-peer network, a local area network ("LAN"), a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, eTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Implementation and use of various technologies for LEO spacecraft radios that provide interface and accommodation of the WCDMA or user definable waveforms can be satisfied through use of fixed function ASIC or reprogrammable FPGA/Processor technologies, depending on performance and functionality needs.

In some aspects, the subject technology is related satellite communications, and in particular to methods and configurations used for persistent low earth orbit (LEO) spacecraft communications. In some aspects, the subject technology may be used in various markets, including for example and without limitation, advanced sensors, data transmission and communications, and information assurance markets.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A system comprising:
   a geostationary earth orbit (GEO)-based communication satellite (ComSat) configured to provide a communication link, the communication link being a persistent and on-demand communication link; and
   one or more space vehicles configured to communicate with the GEO-based ComSat using the communication link employing a Mobile User Objective System (MUOS) compliant wideband code-division multiple-access (WCDMA) waveform within an ultra-high frequency (UHF) band,
   wherein:
   the one or more space vehicles are configured to travel around the Earth in a Low Earth Orbit (LEO), and
   each of the one or more space vehicles includes radio circuitry configured to enable communicating over the UHF band used by the communication link.

2. The system of claim 1, wherein the one or more space vehicles comprise an LEO satellite constellation.

3. The system of claim 1, wherein the GEO ComSat comprises a MUOS ComSat of a MUOS GEO constellation.

4. The system of claim 3, further comprising ground-based MUOS interface facilities configured to communicate with ground teleports associated with the MUOS ComSat via at least one of secret Internet protocol router network (SIPRNET) or non-secured Internet protocol router network (NIRNET).

5. The system of claim 4, wherein the ground teleports are configured to communicate with the MUOS ComSat through a feeder link.

6. The system of claim 4, further comprising a session manager unit configured to communicatively link the MUOS interface facilities with a domain service manager linked with a mission operations center associated with the one or more space vehicles.

7. The system of claim 1, wherein the GEO-based communication satellite is configured to receive mission data from the one or more space vehicles and communicate the mission data to ground-based units including aircrafts, hand held terminals, ships, unmanned aerial vehicles (UAVs).

8. The system of claim 1, wherein the communication link comprises at least one of a low probability-of-intercept (LPI) and a low probability-of-detection (LPD) UHF link that is capable of supporting up to about 384 kilo-bits per second (Kbps).

9. The system of claim 1, further comprising ground control stations configured to access the one or more space vehicles via at least one of SIPRNET or NIRNET through standard IP access.

10. A method comprising:
    configuring a Geostationary Earth Orbit (GEO)-based Communication Satellite (ComSat) to provide a communication link, the communication link being a persistent and on-demand communication link; and
    configuring one or more space vehicles to communicate with the GEO-based ComSat using the communication link employing a Mobile User Objective System (MUOS) compliant wideband code-division multiple-access (WCDMA) waveform within an ultra-high frequency (UHF) band by:
    providing radio circuitry configured to enable communicating over the UHF band used by the communication link,
    wherein the one or more space vehicles are enabled to travel around a Low Earth Orbit.

11. The method of claim 10, wherein the one or more space vehicles comprise an LEO space vehicle, and wherein configuring the GEO ComSat comprises configuring a MUOS ComSat of a MUOS GEO constellation.

12. The method of claim 11, further comprising configuring ground-based MUOS interface facilities to communicate with ground teleports and control centers associated with the MUOS ComSat via at least one of Secret Internet Protocol Router Network (SIPRNET) or Non-secured Internet Protocol Router Network (NIRNET).

13. The method of claim 12, further comprising configuring a session manager unit to communicatively link the MUOS interface facilities with a domain service manager linked with a mission operations center associated with the one or more space vehicles.

14. The method of claim 10, further comprising configuring the GEO-based communication satellite to receive mission data from the one or more space vehicles and to communicate the mission data to ground-based units including aircrafts, hand held terminals, ships, Unmanned Aerial Vehicles (UAVs).

15. The method of claim 10, further comprising configuring the communication link to use a MUOS compliant wideband Code-Division Multiple-Access (WCDMA) waveform within the UHF band.

16. The method of claim 10, further comprising configuring the communication link as at least one of a low probability-of-intercept (LPI) and a Low Probability-of-Detection (LPD) UHF link that is capable of supporting up to about 384 kilo-bits per second (Kbps).

17. The method of claim 10, further comprising configuring ground control stations to access the one or more space vehicles via at least one of secret SIPRNET or NIRNET through standard IP access.

18. A satellite communication system, the system comprising:
one or more Low Earth Orbit (LEO)-space vehicles configured to communicate with a Geostationary Earth Orbit (GEO)-based Communication Satellite (ComSat) using a persistent and on-demand communication link employing a Mobile User Objective System (MUOS) compliant wideband code-division multiple-access (WCDMA) waveform within an ultra-high frequency (UHF) band; and
one or more ground control stations configured to access the one or more LEO space vehicles through an IP access network,
wherein:
each of the one or more LEO space vehicles includes radio circuitry configured to enable communicating over the UHF band used by the communication link, and
the one or more LEO space vehicles are configured to travel around the Earth in an orbit lower than GEO.

19. The system of claim 18, wherein the radio circuitry is further configured to enable the one or more LEO space vehicles to communicate with one another over a peer-to-peer network.

20. The system of claim 18, wherein the GEO ComSat comprises a MUOS ComSat of a MUOS GEO constellation, wherein the one or more ground control stations are configured to access the one or more LEO space vehicles via at least one of secret SIPRNET or NIRNET through standard IP access, and wherein the ground control stations are coupled to at least one MUOS GEO teleport via a MUOS interface facility and a session manager configured to perform MUOS GEO Sat node and beam handovers.

* * * * *